March 13, 1928.　　　　　　　　　　　　　　　1,662,553
A. P. M. WILKING
INTERNAL COMBUSTION ENGINE
Filed Nov. 8, 1926　　　　2 Sheets-Sheet 1
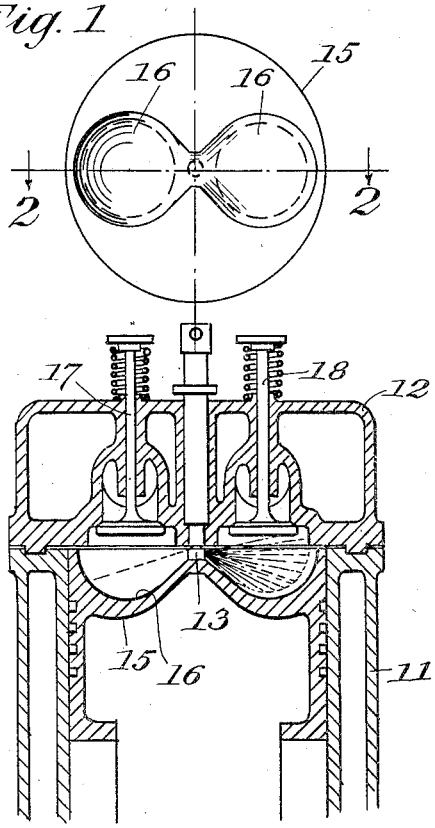
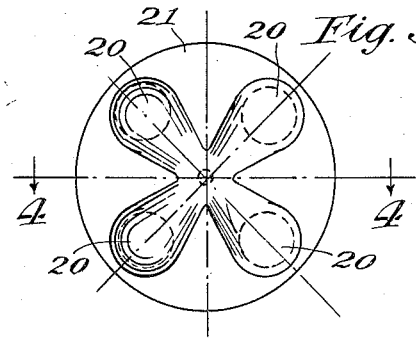
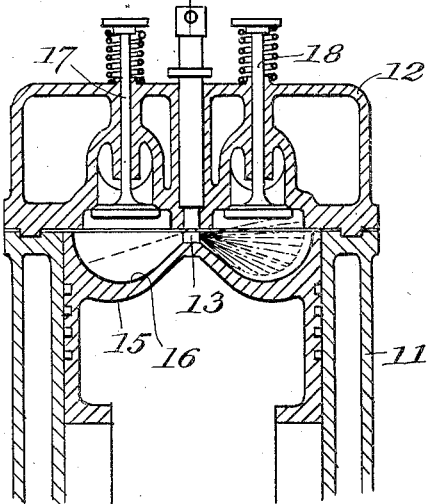
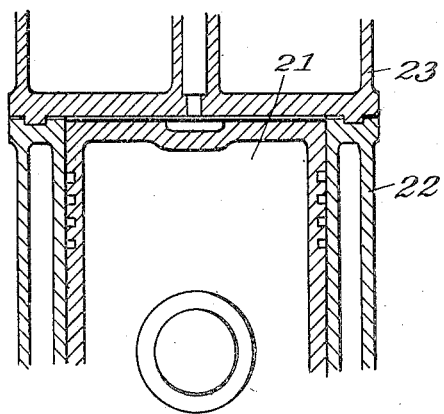
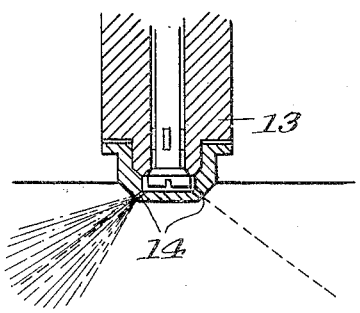
Inventor:
Alphonse P. M. Wilking
By Macleod, Calver, Copeland & Dike
Attorneys.

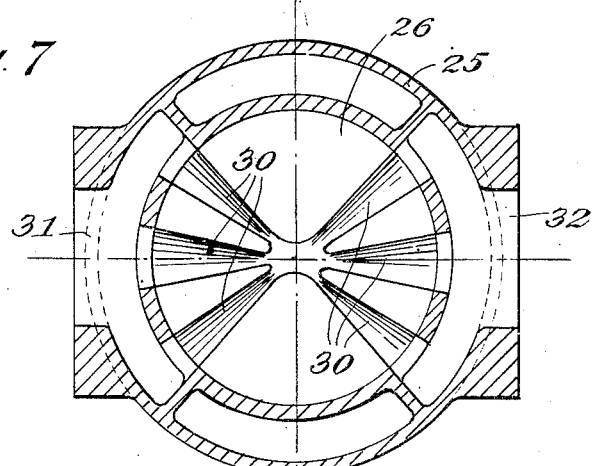
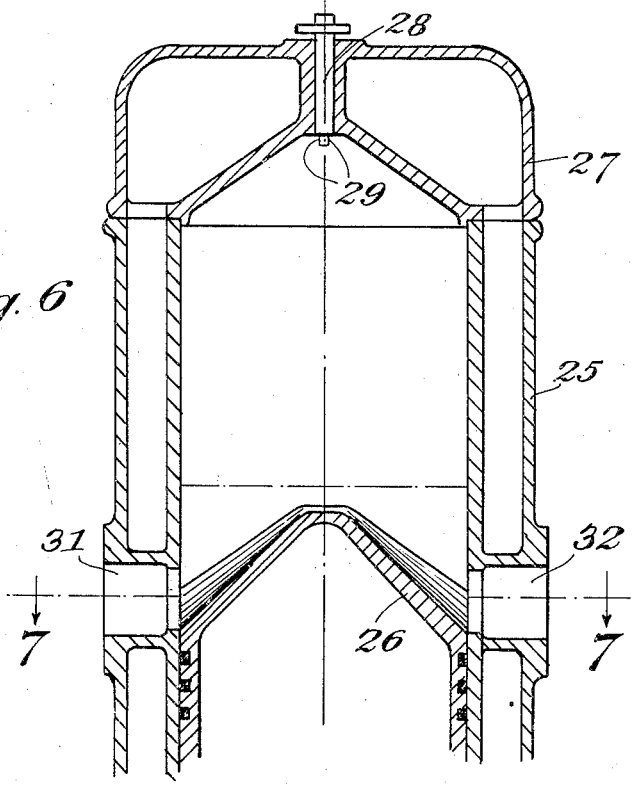

Patented Mar. 13, 1928.

1,662,553

UNITED STATES PATENT OFFICE.

ALPHONSE P. M. WILKING, OF BELMONT, MASSACHUSETTS.

INTERNAL-COMBUSTION ENGINE.

Application filed November 8, 1926. Serial No. 146,941.

My invention has for its object a new and improved internal combustion engine of the type in which air is compressed in the cylinder and fuel is injected into the compressed air and ignited through contact with the heated compressed air. My invention may be embodied either in a two or four cycle engine. The invention has to do particularly with the construction of the combustion chamber and the formation of one or more sub-combustion chambers of a form corresponding as much as practicable to the shape of the diverging jet or fuel particles as the fuel emerges from the orifice so that the fuel is projected into a mass of air practically all of which comes in contact with the particles of fuel.

In accordance with the purposes of this invention, I provide preferably a plurality of radial combustion pockets or chambers approximating the shape of the oil spray, so that the latter contacts and intermixes with the compressed air and its hotter core without contacting with the wall of the pocket or chamber or the outer shell or layer of relatively cooler air. Since the spray has no opportunity to impinge upon a cold wall before it has mingled with the compressed air and before combustion has commenced, combustion will be more complete and carbonization is substantially avoided.

By this construction the fuel valve may be located at the coolest section of the total combustion space. When used with a four cycle type of engine the valves may be so located as to provide a more ready exit for the gases and when used with a two cycle engine scavenging through the ports is found to be more complete. The device also provides an engine having high thermal efficiency, which can be easily started cold without requiring the use of ignition devices at relatively low compressions. Or if desired under some operating conditions, supplementary ignition devices may be utilized. Since all the fuel for the several sub-combustion chambers and therefore each cylinder is injected through a single valve, the quantity of fuel to be controlled by a given valve is greater than would be the case if a separate valve were required for each sub-combustion chamber; consequently the orifice area of the fuel injection valve is larger and less difficulty is likely to be experienced with the operation of the fuel valve than would be the case with a plurality of fuel valves each having smaller openings, and also the quantity of fuel to be metered for each valve is thereby greater and more readily metered. Furthermore it is far simpler, cheaper and easier to operate one valve than two.

In the drawings:

Fig. 1 is a top plan view of the piston of a four-cycle engine embodying my invention.

Fig. 2 is a section on the line 2—2, Fig. 1.

Fig. 3 is a plan view of the piston of a four-cycle engine provided with four radiating sub-combustion chambers.

Fig. 4 is a section on the line 4—4, Fig. 3.

Fig. 5 is a vertical section of the fuel injection valve through the fuel orifice showing the shape and location of the jet as it emerges from the fuel orifice.

Fig. 6 is a vertical section of the cylinder and piston of a two-cycle engine embodying my invention.

Fig. 7 is a horizontal section on line 7—7 of Fig. 6, looking downward.

In the drawings, referring particularly to Figs. 1 and 2, there is shown at 11 a cylinder of a four cycle engine of the oil injection type. At 12 is shown a cylinder head and at 13 there is shown a mechanically or hydraulically operated fuel valve having two fuel discharge orifices 14, 14, see more particularly Fig. 5. These fuel discharge orifices 14, 14 are inclined at an angle and project the fuel downwardly and outwardly in a conical jet as indicated by dotted lines in Fig. 5.

At 15 is shown a piston provided with two sub-combustion chambers or combustion pockets 16, 16 the shape of which will be seen from a comparison of Figs. 1 and 2. These pockets or chambers are arranged radially of the fuel injection valve 13 and are shaped to conform as closely as practicable to the shape of the jet of fuel emitted from the fuel orifices 14, 14. There is a sub-combustion chamber for each orifice and in practice I prefer to make the sub-combustion chamber wholly in the top of the piston, but I do not limit myself to this construction, since it will be apparent that an important feature of the invention is the employment of a sub-combustion chamber or combustion pocket which conforms in shape to the spray emitted from a fuel discharge nozzle. At 17 is shown an air inlet valve and at 18 an exhaust valve, these being preferably located directly over the two sub-combustion chambers.

Referring now to Figs. 3 and 4, there is shown a piston of an engine provided with four combustion pockets or chambers 20 intended to be used with one injection valve having four fuel orifices, the piston being designated 21, the cylinder 22 and the cylinder head 23, this engine having two inlet and two exhaust valves.

My invention is also applicable to a two cycle engine. In Figs. 6 and 7, there is shown a cylinder 25 in which is a piston 26. A cylinder head is shown at 27, and the inlet valve at 28. In this instance the inlet valve is provided with six fuel discharge orifices 29 which are arranged in groups of three on opposite sides of the inlet valve. The piston and cooperating portion of the cylinder head, preferably dome shaped, and the piston is provided with six sub-combustion chambers 30 arranged in groups of three each on the opposite sides of the piston head and of a proper shape and placed in a proper relation to the orifices of the fuel injection valve. The inlet and exhaust ports are shown at 31 and 32 respectively and are located so that they are fully open when the piston is at the lowest point of its stroke, as shown in Fig. 6. My invention when applied to a two cycle engine especially with a cone shaped or domed piston has particular advantages, one of which is more perfect scavenging of the burned gases contained within the cylinder.

In both four cycle and two cycle engines the fuel valve is located in the coolest section of the total combustion space, yet the fuel is injected into a hot core of compressed air and practically all of the combustion air is in the path of the spray or sprays of fuel so that ignition of the fuel particles takes place before they have an opportunity to contact with the walls of the cylinder, or the layer of colder air formed around the combustion chamber, and be recondensed or deposited thereon.

It will, therefore, be noted that I have provided one fuel valve with a plurality of ports or orifices, the spray from each orifice being directed into a distinct combustion pocket. In operation it will be seen that at the top of the compression stroke the top of the piston is preferably in close proximity to the top of the cylinder so that the air is forced under compression into the radial combustion pockets. This action creates a condition of high turbulence of the air practically entirely within the pockets. A layer or shell of cooler air is formed around the wall of the pocket with a central hot core, and the increased degree of turbulence causes effective mixing of the oil and air.

What I claim is:

1. In an oil burning engine of the type in which liquid fuel is ignited through contact with compressed air, the combination of a cylinder, a piston operable within the cylinder, a fuel injection valve having a plurality of orifices, and a plurality of separate combustion pockets for said orifices extending radially from the valve and each approximating the shape of the spray emitted from its orifice.

2. In an oil burning engine of the type in which liquid fuel is ignited through contact with compressed air, the combination of a cylinder, a piston operable within the cylinder, a fuel injection valve having a plurality of orifices, and a corresponding number of separate combustion pockets formed in the top of the piston and extending radially from the valve, each pocket approximating the shape of the spray emitted from its orifice and the centre of the pocket being alined with the axis of the orifice.

3. In an oil burning engine of the type in which liquid fuel is ignited through contact with compressed air, the combination of a cylinder, a piston operable within the cylinder, a centrally located injection valve having a plurality of orifices, and a separate combustion chamber for each orifice.

4. In an oil burning engine of the type in which liquid fuel is ignited through contact with compressed air, the combination of a cylinder, a piston operable within the cylinder, a centrally located injection valve having a plurality of orifices arranged to emit sprays at an angle to the valve, and a separate combustion chamber for each orifice extending radially from the valve and each approximating the shape of the spray emitted from the orifices.

In testimony whereof I affix my signature.

ALPHONSE P. M. WILKING.